United States Patent [19]

Kang

[11] Patent Number: 5,128,190

[45] Date of Patent: Jul. 7, 1992

[54] FIXING DEVICE FOR A WHEEL COVER

[76] Inventor: Richard Kang, 972, Kung-Yaun Road, Tai-Nan City, Taiwan

[21] Appl. No.: 688,103

[22] Filed: Apr. 19, 1991

[51] Int. Cl.$^5$ .......................... B60B 7/12; B32B 3/06
[52] U.S. Cl. ...................................... 428/99; 428/138
[58] Field of Search .................. 428/99, 31, 138; 301/37 R, 37 C, 37 S, 37 TP, 37 T

[56] References Cited

U.S. PATENT DOCUMENTS 4,712,838 12/1987 Berg et al. .................... 301/37 R Primary Examiner—Alexander S. Thomas
Attorney, Agent, or Firm—Morton J. Rosenberg; David I. Klein

[57] ABSTRACT

This invention relates to a fixing device for a wheel cover of a vehicle and in particular to one including an adjusting loop with two straight ends between which there is a crack and being provided with right hand threads and left hand threads, a nut having right hand threads at one end and left hand threads at the other threadedly engageable with corresponding ends of of the adjusting loop, a plurality of mounting seats welded on the adjusting loop, and a plurality of positioning plates with a threaded hole at the center and inserted into the slot of the mounting seats, whereby the wheel cover may be easily and conveniently engaged with the wheel disk without endangering the safety of the vehicle.

1 Claim, 6 Drawing Sheets

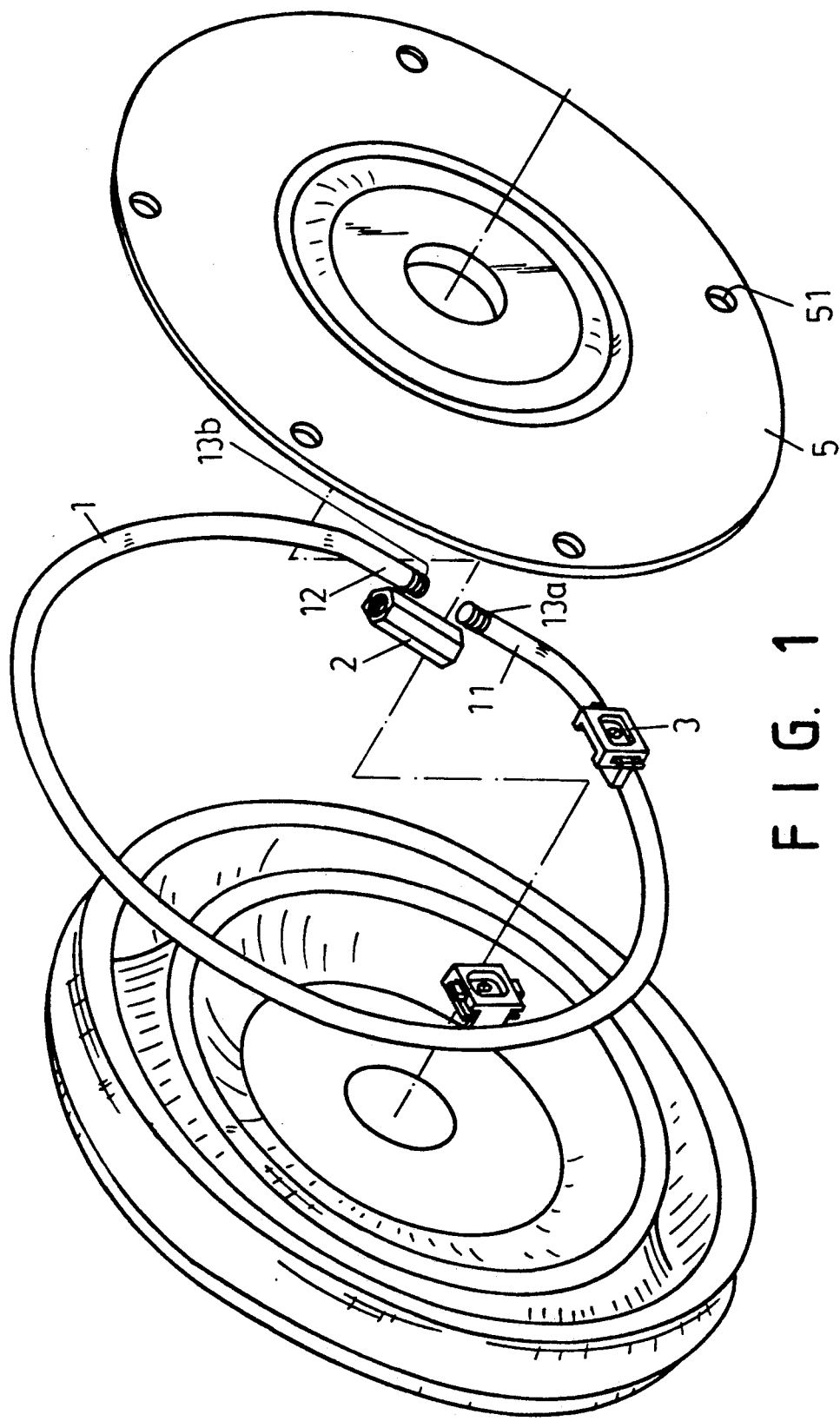

B-B

A-A

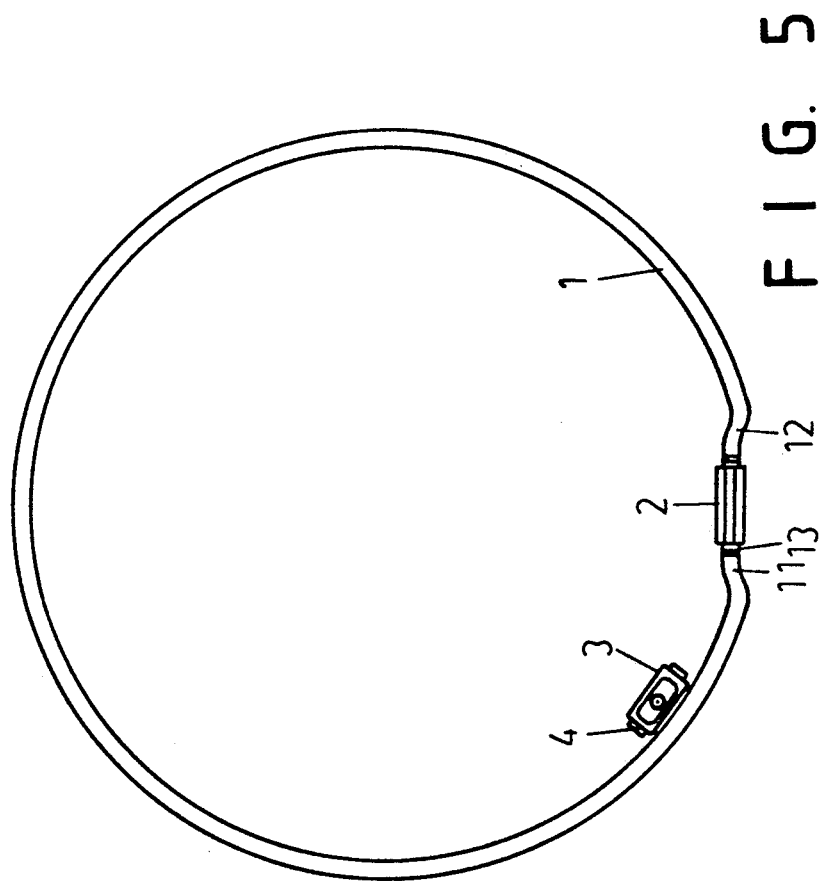

FIXING DEVICE FOR A WHEEL COVER

BACKGROUND OF THE INVENTION

It is found that the two legs of the prior art fixing device for wheel covers cannot be adjusted in distance (see FIGS. 7 and 8) and the number of bolts and the distance therebetween of different wheel disks are not the same so that a number of fixing devices are required to prepare for adapting various wheel covers. The fixing device shown in FIG. 7 is designed for use with the front wheel while the fixing device shown in FIG. 8 with the rear wheel. Further, the large bolts must be withdrawn in order to mount the fixing device on the wheel disk thereby seriously endangering the safety of the vehicle. Moreover, the wheel cover is liable to be loosened when subjected to vibration produced in the travelling of the vehicle.

Therefore, it is an object of the present invention to provide a fixing device for a wheel cover which may obviate and mitigate the above-mentioned drawbacks.

SUMMARY OF THE INVENTION

This invention is especially designed to fixedly fit a wheel cover to a wheel of a large vehicle.

It is the primary object of the present invention to provide a fixing device for a wheel cover which does to require to withdraw the large bolts in order to fit a wheel cover on a wheel disk.

It is another object of the present invention to provide a fixing device for a wheel cover which does not need large tools for mounting a wheel cover on a wheel disk.

It is still another object of the present invention to provide a fixing device for a wheel cover which is suitable for use with various wheel covers.

It is still another object of the present invention to provide a fixing device for a wheel cover which is easy in operation.

Other objects and further scope of the present invention will become apparent from the detailed description given hereinafter. It should be understood, however, that the detailed description and specific example, while indicating preferred embodiment of the invention, is given by way of illustration only, since various changes and modifications within the spirit and scope of the invention will become apparent to those skilled in the art from this detailed description.

BRIEF DESCRIPTION OF THE DRAWINGS

FIG. 1 is an exploded view of a fixing device for a wheel cover of a vehicle according to the present invention;

FIG. 5 is a plan view of the adjusting loop of the fixing device;

DETAILED DESCRIPTION OF THE PREFERRED EMBODIMENT

Figure 4:
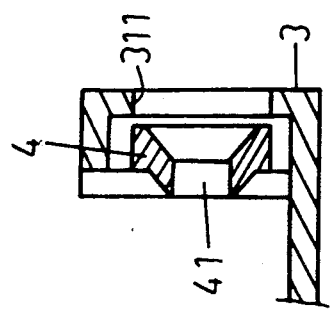
FIG. 4 is a sectional view taken along line B—B of FIG. 2.

With reference to the drawings and in particular to FIG. 1 thereof, the fixing device for a wheel cover according to the present invention mainly comprises an adjusting loop 1 which is provided with two straight ends 11 and 12 forming a crack therebetween. The ends 11 and 12 are respectively formed with right hand threads 13a and left hand threads 13b and joined together with a nut 2 with right hand threads at one end and left hand threads at the other so that the nut 2 may be turned to adjust the diameter of the adjusting loop 1 thereby adapting to wheel disks with slightly different diameters.

Figure 3:
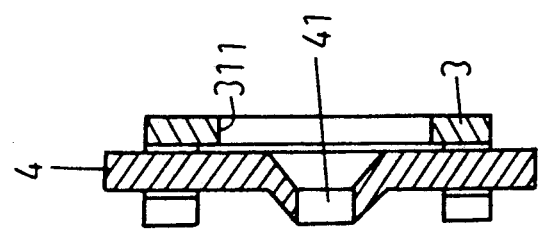
FIG. 3 is a sectional view taken along line A—A of FIG. 2.
Figure 2:
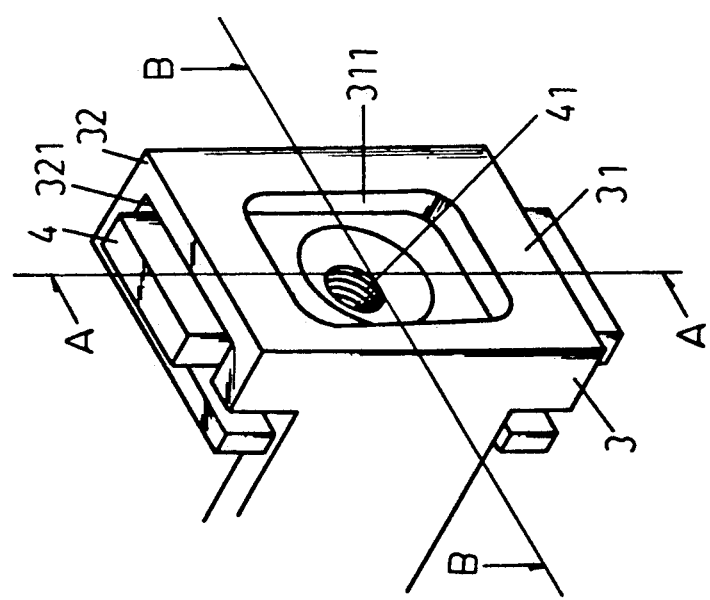
FIG. 2 is enlarged fragmentary view showing the structure of the mounting seat of the fixing device.

The adjusting loop 1 is welded with a plurality of mounting seats 3 (only two of them are shown). As illustrated in FIGS. 2, 3 and 4, the mounting seat 3 has a front side 31 on which there is a hole 311. The upper and the lower sides 32 of the mounting seat 3 are provided with a slot 321 in which is inserted a positioning plate 4 with a threaded hole 41 at its center. The positioning plate 4 may be slightly moved in the slot 321.

Figure 6:
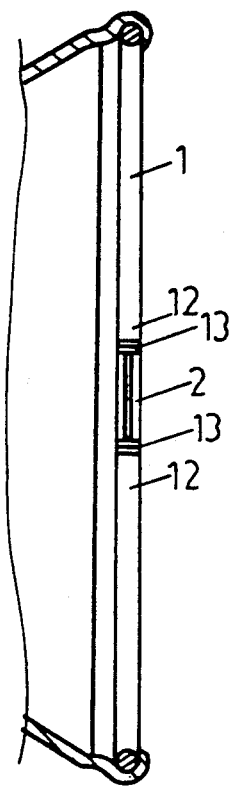
FIG. 6 is a sectional view showing the engagement of the adjusting loop and the wheel disk.
Figure 7:
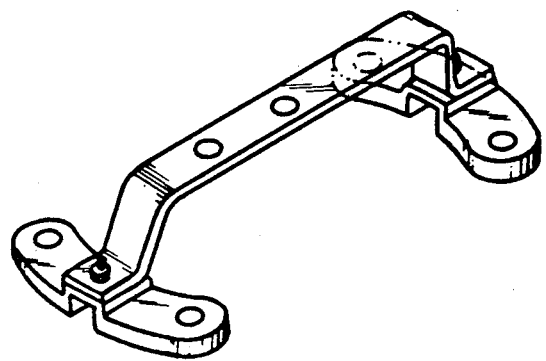
FIG. 7 shows a mounting seat of a prior art fixing device for the front wheel.
Figure 8:
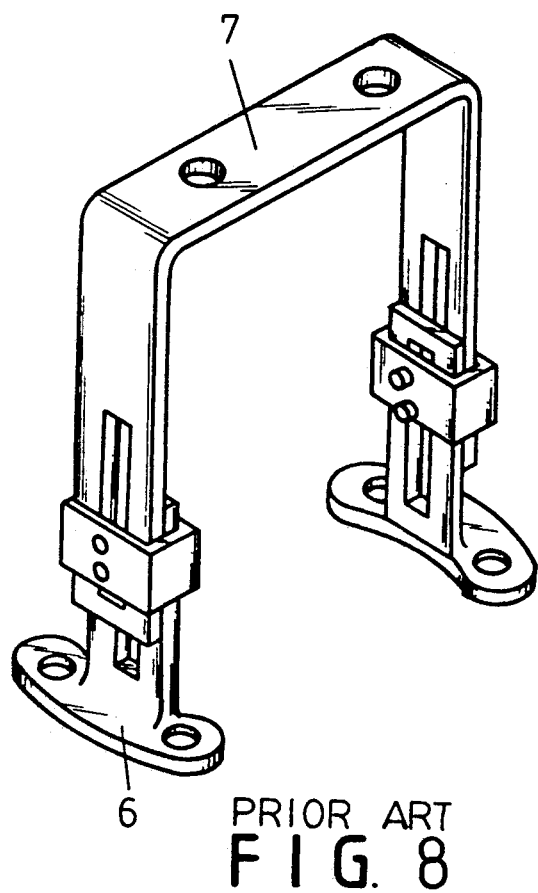
FIG. 8 shows a mounting seat of a prior art fixing device for the rear wheel.

The wheel cover 5 is provided with holes 51 the number of which is the same as that of the mounting seat 3. Since the positioning plate 4 may be slightly adjusted in position, the mounting seat 3 may be conveniently adapted to the hole 5. In assembly, the adjusting loop 1 is snug-fitted into the lip of the wheel disk (see FIG. 6).

In comparison with the prior art, a present invention utilizes the adjusting loop 1 to engage with the outer rim flange of the disk while the prior art is fixedly mounted on the wheel disk. Further, the mounting seat 3 on the adjusting loop 1 is provided with positioning plates 4 which may be slightly moved to adapt to the holes of the wheel cover so that the circumference of the wheel cover may be fixedly connected with the adjusting loop, whereas the center of the wheel cover is fixedly connected with the mounting seat of the prior art. As to the operation and effect, it is necessary for the prior art to use large tools for mounting and the wheel cover is not easy to be correctly fitted with the disk. The most important defect of the prior art is that the large bolt should be withdrawn when the wheel cover is mounted on the disk thereby seriously endangering the safety of the vehicle. In addition, the wheel covers are different in height and so it is necessary to adjust the mounting seat to adapt thereto. However, the present invention does not have the above-mentioned drawbacks of the prior art and is convenient and easy to fit the wheel cover on the disk.

Accordingly, it is to be understood that while certain form of this invention has been illustrated and described, it is not to be limited thereto, accept in so far as such limitations are included in the following claims.

I claim:

1. A fixing device for a wheel cover comprising:
   an adjusting loop with two straight ends between which there is a crack, said ends being formed with right hand threads and left hand threads respectively;
   a nut having right hand threads at one end and left hand threads at the other threadedly engageable with corresponding ends of of said adjusting loop;
   a plurality of mounting seats welded on said adjusting loop, said mounting seat having a front side on which there is a hole and an upper side with a lower side provided with a slot;
   a plurality of positioning plates with a threaded hole at the center and inserted into the slot of said mounting seats, the threaded hole of said positioning plate being used to engage with a hole of said wheel cover.

* * * * *